Dec. 1, 1959   D. E. RUECKERT   2,915,235
CONTAINER FOR FROZEN FOODS
Filed Oct. 29, 1956

INVENTOR.
DEAN E. RUECKERT
BY
R. G. Story
ATTORNEY

United States Patent Office 2,915,235
Patented Dec. 1, 1959

2,915,235

CONTAINER FOR FROZEN FOODS

Dean E. Rueckert, Mokena, Ill., assignor to Swift & Company, Chicago, Ill., a corporation of Illinois Application October 29, 1956, Serial No. 618,954

1 Claim. (Cl. 229—23)

The present invention relates to a shipping and storage container. More particularly, the present invention is directed to a collapsible container suitable for use in the transportation and storage of frozen foods.

The substantial increase in the production of consumer size packaged frozen food products constitutes one of the most important recent developments in the food industry. Large amounts of frozen vegetables, fruits, meats, etc., packaged in small household units, are now being distributed for direct retail level selling in a frozen state. If properly prepared and handled, these articles can be kept for as long as six months to two years without a noticeable loss in quality. Once the products are allowed to thaw, however, they cannot be re-frozen without severe damage resulting.

Shipping foods such as meats, vegetables, etc. directly from a processing plant in a frozen condition creates heretofore unencountered transportation problems. Due to prior practices in the meat industry, for example, most trucks and refrigerated railroad cars used in moving meat from plant to consumer are capable of being cooled only to about 30° to 35° F. Although such temperatures previously were adequate, it has been found that temperatures at least as low as 0° F. are necessary in order to keep meats satisfactorily frozen. Processors seeking to enter the frozen meats business, therefore, are faced with the necessity of developing additional equipment capable of providing the lower temperatures required in shipping and storing frozen product.

In order to be feasible from an economic standpoint, this additional equipment should be adaptable for use in connection with existing facilities such as refrigerated trucks and cabinets which are used and presumably will remain in use in transporting fresh product. The need for a reasonably inexpensive shipping means is especially felt in distributing meats and other foods from storage houses or sales units to retail outlets. It is a usual practice for company representatives to deliver small orders of from 50 to 300 pounds of meat, for example, to each of several customers along a given route. The limited size of these orders prohibits their being individually packaged or handled, due to the increased costs involved.

It is, therefore, an object of the present invention to provide an inexpensive container that can be used effectively along with existing facilities to keep product frozen during transportation and for limited storage periods.

Another object of the present invention is to provide a low cost container that can be used to keep product frozen during the delivery of small orders from sales units to retail outlets.

Additional objects, if not specifically set forth herein, will become readily apparent to one skilled in the art from the following detailed description of the invention.

Generally, the present invention comprises the discovery of a three-section collapsible corrugated board container having an identical top and bottom portion which is capable of maintaining food items in a frozen condition for extended periods of time through the action of Dry Ice.

Figure 1:
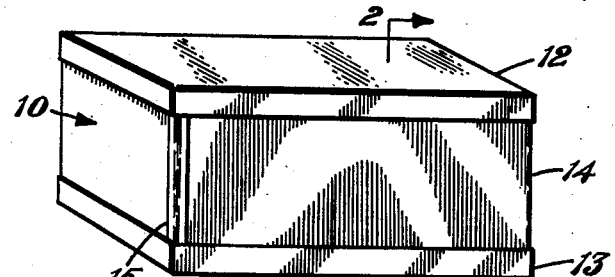
Figure 1 is a perspective view which illustrates the complete container.
Figure 4:
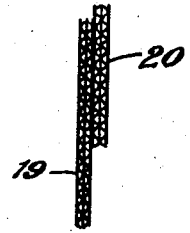
Figure 4 is an enlargement of a partial section through the corrugated board used in the present invention.
Figure 2:
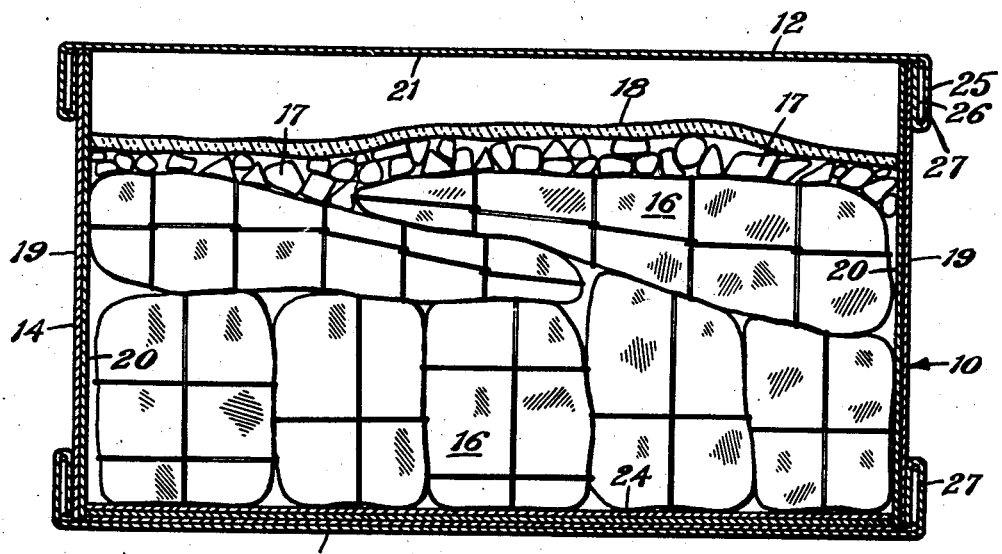
Figure 2 shows a section through line 2—2 of the closed and packed container.
Figure 3:
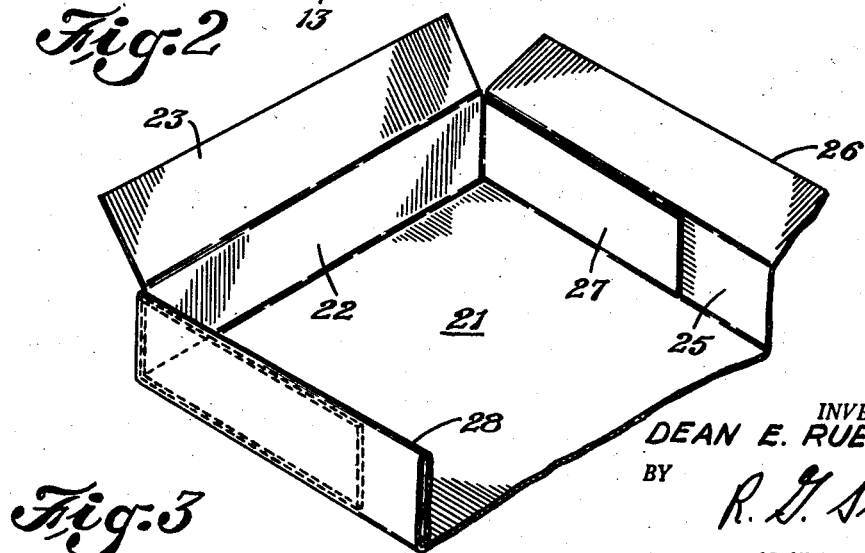
Figure 3 is a partially perspective view of the top (or bottom) of the container which shows the manner in which the top or bottom cover is constructed.

In Figure 1 the container is shown generally to have an identical top and bottom portion 12 and 13, along with a middle section 14 which is permanently united by gummed strip 15. Figure 2 illustrates the use of the container and shows packages of food 16 which are covered by Dry Ice 17 and by a fleece paper, rubber, etc. insulating blanket 18. The walls of middle section 14 consist of an outer layer 19 and an inner layer 20 of double corrugated board. Also shown in this cross-sectional view are the body 21, side 25, side flap 26, and tongue 27 of top 12. Beneath the packages 16 and wedged against inner layer 20 is a pad 24 made of double corrugated board. In Figure 3 a partially perspective view is set forth which shows the construction of cover top 12. The end 22 of cover 12 is connected to tongues 27; side flaps 26 are folded over tongues 27 at fold line 28; and end flaps 23 are folded against end 22. Figure 4 shows the relationship of outer layer 19 and inner layer 20 of the walls of middle section 14.

The function performed by pad 24 is particularly important to the success of the subject container. As is shown in Figure 2, the pad is wedged against inner layer 20 of middle section 14 which, in turn, is thereby pressed against the side flaps of bottom assembly 13. This relation of the pad to the side walls creates a seal that enables refrigerating gases to be held within the box for much longer periods of time than is possible in comparable containers presently known to the art.

In test shipments from Chicago, Illinois to New York city, New York it was found that 16 pounds of Dry Ice provided a sufficient amount of coolant to keep 100 pounds of packaged meats satisfactorily frozen even on unrefrigerated railroad cars. More or less Dry Ice may be required depending upon weather conditions and the type of equipment used in transporting the product.

Inasmuch as glue, staples, gummed tape and other binding materials are not required, it is a simple matter to set up the box in three minutes' time or less in the truck, railroad car, or storage bin where it is needed. This simplified assembly procedure eliminates the necessity of pre-forming the boxes and greatly reduces the amount of space taken up by them when they are not in use since each section of the container can be flattened out for storage purposes.

After the box or boxes have been assembled, for example on a truck, they are filled with a given number of packages and a given quantity of Dry Ice. It has been found that containers capable of holding from 300 to 500 pounds of product are satisfactory for use in delivering orders to retail outlets. An insulating blanket, which can be made of fleece paper, rubber, or other suitable materials, follows the contours of the packages in the container and effectively separates the warm air above the blanket from the cold air generated by the Dry Ice and frozen foods. The ease with which the blanket is removed and replaced makes it possible to conveniently deliver small orders from the box on sales routes.

The adaptability of the subject invention to diverse conditions such as weather, product volume, etc., enables processors to satisfactorily enter the frozen foods business without the necessity of making large expenditures for mechanically refrigerated trucks and low temperature storage freezers. Further economies are obtained in that the top and bottom portions of the box are interchangeable and because each of its components is completely separable allowing damaged elements to be replaced without having to discard the entire container.

Obviously many modifications and variations of the invention as hereinbefore set forth may be made without departing from the spirit and scope thereof, and therefore only such limitations should be imposed as are indicated in the appended claim.

I claim:

A tripartite container formed of corrugated board, or the like, comprising: a collapsible bottom section, a collapsible middle section forming the side walls of said container and adapted to be fitted within said bottom section, a snug-fitting pad, formed of corrugated board, being disposed at the lowermost juncture of said bottom section and said middle section, which presses outwardly against said middle section to provide a tight seal between said middle section and said bottom section, and a collapsible top section, identical in construction to said bottom section, adapted to fit snugly about the open end of said side walls to form a closed, unitary, container.

References Cited in the file of this patent

UNITED STATES PATENTS

| | | |
|---|---|---|
| 1,952,026 | Bennett | Mar. 20, 1934 |
| 2,006,705 | Bangos | July 2, 1935 |
| 2,216,330 | Stover | Oct. 1, 1940 |
| 2,346,466 | Belsinger | Apr. 11, 1944 |
| 2,595,498 | Wiesman et al. | May 6, 1952 |
| 2,631,439 | Feigenbaum | Mar. 17, 1953 |
| 2,700,877 | Samboilo | Feb. 1, 1955 |